United States Patent
Krieg et al.

(10) Patent No.: US 6,337,491 B1
(45) Date of Patent: Jan. 8, 2002

(54) LIGHT/RAIN SENSING SYSTEM FOR A VEHICLE

(75) Inventors: Karl-Heinz Krieg, Erkenbrechtsweiler; Martin Krug, Karlsruhe, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/335,768

(22) Filed: Jun. 18, 1999

(30) Foreign Application Priority Data

Jun. 18, 1998 (DE) .......................................... 198 27 044

(51) Int. Cl.⁷ .............................................. G08B 21/00
(52) U.S. Cl. ........................ 250/573; 340/602; 318/483
(58) Field of Search ........................... 250/573, 227.25, 250/239; 318/483; 307/10.8, 10.1, 117, 118; 340/600–604, 901; 356/436

(56) References Cited

U.S. PATENT DOCUMENTS

| | | | |
|---|---|---|---|
| 4,673,844 A | * | 6/1987 | O'Farrell et al. ............ 250/341 |
| 5,537,003 A | * | 7/1996 | Bechtel et al. ................ 315/82 |
| 5,661,303 A | * | 8/1997 | Teder ....................... 250/341.8 |
| 6,030,105 A | * | 2/2000 | Thau et al. .................. 362/488 |
| 6,084,519 A | * | 7/2000 | Coulling et al. ............ 340/602 |

FOREIGN PATENT DOCUMENTS

| | | |
|---|---|---|
| DE | 37 37 395 A1 | 5/1989 |
| DE | 43 29 983 A1 | 3/1995 |
| DE | 195 26 249 A1 | 2/1996 |
| EP | 0 009 414 A1 | 9/1979 |
| EP | 0537 471 A1 | 9/1992 |
| FR | 2 437 321 | 9/1978 |
| WO | WO 94/27262 | 11/1994 |
| WO | WO 97/06997 | 2/1997 |

* cited by examiner

Primary Examiner—Stephone B. Allen
(74) Attorney, Agent, or Firm—Crowell & Moring LLP

(57) ABSTRACT

A sensing system for the detection and analysis of light and/or rain conditions affecting the vehicle has a mounting which can be installed within the scope of an assembly line production. The sensing system has a light sensor and a light sensor control unit and/or a rain sensor and a rain sensor control unit and a common carrier plate on which the light sensor with the light sensor control unit as well as the rain sensor with the rain sensor control unit can be mounted.

13 Claims, 1 Drawing Sheet

LIGHT/RAIN SENSING SYSTEM FOR A VEHICLE

BACKGROUND AND SUMMARY OF THE INVENTION

This application claims the priority of German patent document 198 27 044.5, filed Jun. 18, 1998, the disclosure of which is expressly incorporated by reference herein.

The invention relates to a sensing system for a vehicle, particularly for a motor vehicle, for the detection and analysis of light and/or rain conditions affecting the vehicle.

German Patent Document DE 43 29 983 A1 discloses an arrangement for a motor vehicle which has one or several sensors arranged in a common roof module for receiving or transmitting optical and/or electromagnetic radiation. This roof module is arranged near a window of the motor vehicle at a point where incoming signals are not interfered with, if possible. The sensors are aligned such that the radiation acting upon them from the outside can be received through the window of the motor vehicle or its rays can be emitted to the outside. A preferred arrangement of the sensors is in the area of the windshield which is cleaned by the windshield wipers. The known roof module has, for example, a luminous-intensity sensor, a crash camera, a microwave antenna, a rain sensor and a compass sensor which are housed inside the roof module at corresponding suitable points.

A light sensing system constructed for detection of and reaction to light conditions acting upon the vehicle is equipped with a light sensor and with a light sensor control unit. Such a light sensing system determines the actual light conditions and correspondingly controls, for example, the headlights or the low beam light of a vehicle equipped therewith. For example, the low beam of the vehicle is switched on automatically at dusk, and when a tunnel is entered; and is switched off automatically when the tunnel is exited. Such a light sensing system is used to improve the vehicle safety. A light sensing system of this type is known, for example, from German Patent Document DE 37 37 395 A1.

A rain sensing system, which is constructed for detecting and reacting to rain conditions acting upon the vehicle is equipped with a rain sensor and a rain sensor control unit. Such a rain sensing system determines, for example, the quantity of the water collecting on the windshield of a vehicle, and controls the frequency of the wiper blades as a function thereof. The rain sensing system can also switch the wiper blades on and off automatically, and automatically controls the required wiping frequency in order to ensure continuous sufficient visibility conditions for the driver. The rain sensing system also helps to increase vehicle safety. Such a rain sensing system is known, for example, from German Patent Document DE 195 26 249 A1.

A sensing system of this type is normally installed into the vehicle as an option during assembly line production, or can be installed subsequently on the vehicle. A vehicle can be equipped with either or both of a rain sensing system and a light sensing system. In some high-quality vehicle models, such a sensing system (for example, the light sensing system) may be standard equipment. As an option for the buyer, the other sensing system (for example, the rain sensing system) can then be added later as optional equipment. Because of the multiple design variants, the logistic expenditures are particularly high for always making available the correct components or the individually equipped vehicles within the assembly line production. In addition, assembly requires relatively high expenditures.

An object of the present invention is to provide an improved sensing system of the initially mentioned type which can economically and easily be installed within the scope of an assembly line production.

This and other objects and advantages are achieved by the sensing system according to the invention, which is based on the general idea of providing a common carrier plate for the rain sensing system (rain sensor and rain sensor control unit) and the light sensing system (light sensor and light sensor control unit). By means of the carrier plate, one and/or the other sensing system can be mounted on the vehicle. That is, at least one standard carrier plate can be installed on the vehicle, with either or both sensors (and the respective associated control units) mounted on the carrier plate, corresponding to individual wishes.

Furthermore, an advantageous embodiment permits the fixed installation of a sensor (and pertaining sensor control unit) on the carrier plate so that the other sensor (and sensor control unit) can optionally be mounted on the carrier plate.

In order to simplify equipping the carrier plate with the sensors and the sensor control units, the sensors and the pertaining sensor control units can in each case be combined to a sensor component which can be mounted as such (as a one-piece component) on the carrier plate.

In an advantageous embodiment of the sensing system according to the invention, a housing is provided which can be mounted on the carrier plate and which covers the carrier plate and the respective sensors, sensor control units and sensor components mounted thereon, at least toward the vehicle interior, and satisfies in particular appropriate aesthetic requirements.

In an advantageous embodiment of the sensing system according to the invention, plug-type connections can be provided for mounting the housing, the respective sensors (with associated sensor control units) and a sensor component on the carrier plate. In this manner, the mounting of the individual components on the carrier plate can be carried out easily and rapidly. In addition, in series production, individual equipment options can be taken into account just as rapidly and easily.

Particularly with a view to a series production, it is of a special advantage for the complete cabling, by which the sensing system can be connected with the power supply and with the assemblies to be controlled thereby, to be installed as standard equipment in the vehicle. In this manner, the optional equipment elements (rain sensing system and/or light sensing system) can also be mounted on the vehicle subsequently in any combination, without additional expenditures.

It is understood that the above-mentioned characteristics and the characteristics which will be explained in the following can be used not only in the respective indicated combination but also in other combinations or alone without leaving the scope of the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
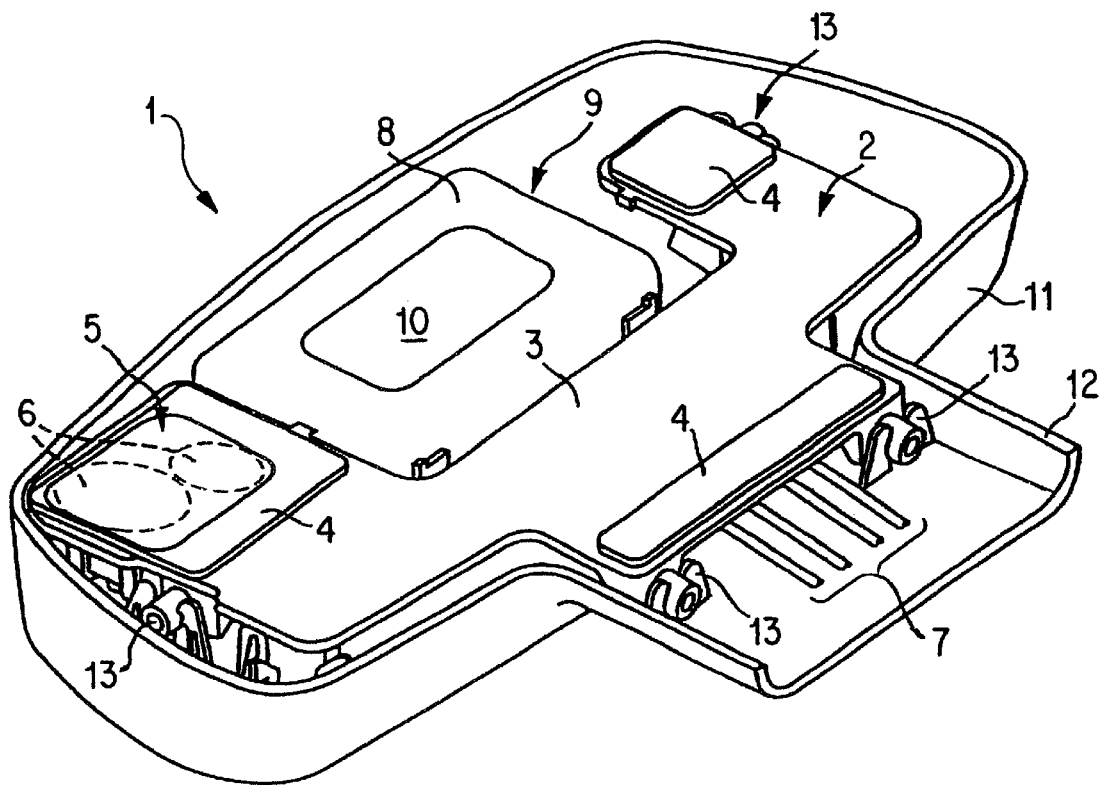
FIG. 1 is a schematic three-dimensional view of a sensing system according to the invention.

As shown in FIG. 1, a sensing system 1 according to the invention has a carrier plate 2. On a front side 3 of the carrier plate 2, several (for example, three) adhesive strips 4 are mounted, by which the carrier plate 2 can be fastened on the interior side of a vehicle windshield (not shown) particularly that of a motor vehicle. For this purpose, the adhesive strips 4 are preferably provided with a layer of glue so that the carrier plate 2 can be fixed to the windshield during the assembly, simply being pressed on.

A light sensor 5 is fixedly installed in the carrier plate 2, and has a lens system 6 which penetrates the carrier plate 2 in the area of one of the adhesive strips 4, so that the adhesive strip 4 laterally frames the light sensor 5. The light sensor 5 is preferably fastened on a back side of the carrier plate 2 (which is not visible in the representation of FIG. 1). Likewise, a light sensor control unit (not shown), is installed on the backside of the carrier plate 2. Electric connections necessary to supply the light sensor 5 and the light sensor control unit with electric energy, and to transmit control signals generated thereby to the corresponding assemblies of the vehicle which are to be triggered (for example, the light system of the vehicle), also already exist on the back side of the carrier plate 2. A corresponding cabling 7 connects the electric components of the sensing system 1 with an energy source of the vehicle and with the corresponding assemblies to be controlled and with a central vehicle control system.

The light sensing system (light sensor 5 and light sensor control unit) fixedly installed in this manner on the carrier plate 2 is thereby automatically also installed during each fastening of a carrier plate 2 on a vehicle windshield.

Figure 2:
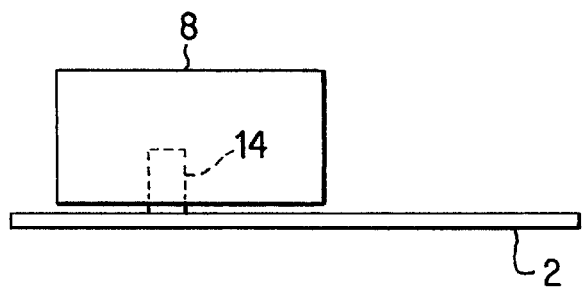
FIG. 2 is a schematic illustration of a plug type connection between a sensor component and a substrate of the sensing system according to the invention.

In contrast, a rain sensor 8 can be optionally mounted on the carrier plate 2. For this purpose, a conventional plug-type connection 14 (FIG. 2) is provided between, and mechanically and electrically couples, the rain sensor 8 and the carrier plate 2. In the illustrated preferred embodiment, the rain sensor 8 is part of a rain sensor component 9, which also contains a pertaining rain sensor control unit. The rain sensor component 9 can therefore be mounted on the carrier plate 2 as an individual component.

For this purpose, the carrier plate 2 is equipped with electric connections such that, immediately after the plugging-on of the rain sensor component 9, the cabling 7 can also supply electric energy to the rain sensor 8 and its rain sensor control unit, and can transmit the electric control signals originating from the rain sensor control unit to the corresponding assemblies of the vehicle (here, the wiper control).

The construction of the carrier plate 2 and the sensors 5 and 8 mounted thereon are mutually coordinated such that, when the carrier plate 2 is mounted on the windshield, the lens system 6 of the light sensor 5 and a lens system 10 of the rain sensor 8 essentially come to rest on the windshield. In this manner, particularly good measuring results can be achieved.

Naturally, the rain sensing system (rain sensor 8 and the pertaining rain sensor control unit) can also be mounted on the carrier plate 2 when this carrier plate 2 is already fixedly installed on a windshield of a vehicle.

The sensing system 1 also has a housing 11 which is open in the direction of the windshield and which, toward the vehicle interior, frames the carrier plate 2 and the constructional elements mounted thereon, in a visually attractive manner. On one side, the housing 11 is lengthened in the shape of a neck 12 which additionally covers the cabling 7.

The sensing system 1 is mounted on the windshield of a passenger car, preferably in the plane of symmetry of the windshield, at its upper edge, thereby ensuring that it does not impair the driver's visibility range. In addition, the sensing system 1 is positioned so that the lens systems 6 and 10 are each still situated within the wiping range of a windshield wiper system of the vehicle. This arrangement ensures the operability of the sensors 5 and 8. If the sensing system 1 is mounted on the upper edge of the windshield of the vehicle, it is also taken into account that the neck 12 of the housing 11 can penetrate into a ceiling of the vehicle, so that the cabling 7 can be guided in an invisible manner to the corresponding assemblies and to the energy supply system.

The housing 11 is fastened onto the carrier plate 2 by means of snapping or locking connections 13 between the housing 11 and the carrier plate 2. In this manner, the housing 11 is detachably connected to the carrier plate 2 so that, if necessary, a servicing of the sensing system 1 can be carried out. Likewise, the sensing system 1 with the rain sensor 8 and the rain sensor component 9 can be retrofitted.

The carrier plate 2 is adapted to the housing 11 such that, when the carrier plate 2 is fastened to the windshield and when the housing 11 is snapped or fitted to the carrier plate 2, a venting gap is formed between the windshield and the housing 11. This gap prevents the condensation of water, which might otherwise damage the electronic and electric elements of the sensing system 1, in the interior of the housing 11.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Sensing system for a vehicle, for the detection and analysis of light and/or rain conditions affecting the vehicle, comprising:
   at least one sensor selected from the group consisting of a light sensor with a light sensor control unit, and a rain sensor with a rain sensor control unit; and
   a common carrier plate on which a light sensor with the light sensor control unit and a rain sensor with the rain sensor control unit are mountable; wherein
   at least one of the sensors with its control unit are combined in a single piece sensor component which is mountable as a unit on the carrier plate; and
   the carrier plate includes plug-type connections which provide both a mechanical and an electric linkage for mounting at least one single piece sensor component to the carrier plate.

2. Sensing system according to claim 1, wherein
   one sensor with its control unit is fixedly mounted on the carrier plate; and
   another sensor with its control unit is mountable on the carrier plate.

3. Sensing system according to claim 1, further comprising a housing detachably fastened on the carrier plate, which housing, in an installed state of the carrier plate on a windshield of the vehicle, is open toward the windshield and, in the direction of the vehicle interior, surrounds the carrier plate and the sensors and control units mounted thereon.

4. Sensing system according to claim 3, wherein, in the installed state of the carrier plate on the windshield, a venting gap is formed extending about the periphery of the housing, between the housing fastened on the carrier plate and the windshield.

5. Sensing system according to claim 1, wherein the housing is mountable on the carrier plate by mechanical linking via snap-type or lock-type connections.

6. Sensing system according to claim 1, wherein the sensors and the control units are fixedly mounted to the carrier plate.

7. Sensing system according to claim 1, wherein
    the carrier plate has fastening devices for fastening on an interior side of a windshield of a vehicle; and
    the carrier plate is configured such that each sensor mounted thereon comes to rest against the windshield when the carrier plate is fastened on the windshield.

8. Sensing system according to claim 1, wherein the carrier plate can be connected to a cabling by which the sensors and their control units are supplied with electric energy and control signals of the control units are transmitted to the assemblies of a vehicle to be controlled.

9. A mounting assembly for installing at least one light sensor assembly in a vehicle interior, comprising:
    a carrier plate;
    at least one adhesive element for installing said carrier plate on an interior of a vehicle windshield;
    a plurality of mounting plugs on said carrier plate, which plugs provide both mechanical and electrical linkage for mounting at least one light sensor on said carrier plate in an orientation such that in an installed condition of said carrier plate on said vehicle windshield a sensor element of said light sensor assembly is directed toward and is in proximity to said vehicle windshield; and
    electrical couplings on said carrier plate for connecting said plurality of mounting plugs with an electrical supply of said vehicle.

10. Mounting assembly according to claim 9, further comprising an assembly housing which is detachably attached to said carrier plate, and which in an installed condition of said carrier plate, covers said mounting assembly on sides which are exposed toward said vehicle interior.

11. A sensing system for a vehicle, or detection of ambient conditions affecting the vehicle, said sensing system comprising:
    a carrier plate;
    a component for fixedly mounting said carrier plate to said vehicle; and
    at least one sensor mounted on said carrier plate;
    wherein said mounting plate has plug-type connections which provide both mechanical and electrical linkage for mounting a plurality of sensors thereon.

12. The sensing system for a vehicle according to claim 11, wherein:
    said at least one sensor is fixedly mounted on said carrier plate; and
    additional sensors are detachably mountable on said plate via said connections.

13. The sensing system for a vehicle according to claim 12, wherein:
    said at least one sensor comprises a light sensor; and
    said additional sensors comprise at least a rain sensor.

* * * * *